E. Dunscomb,
Reciprocating Steam Engine,
Nº 47,283. Patented Apr. 18, 1865.
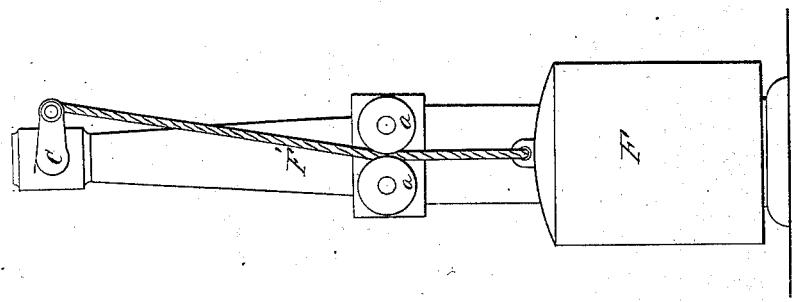
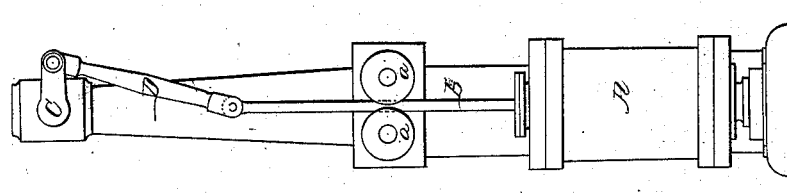
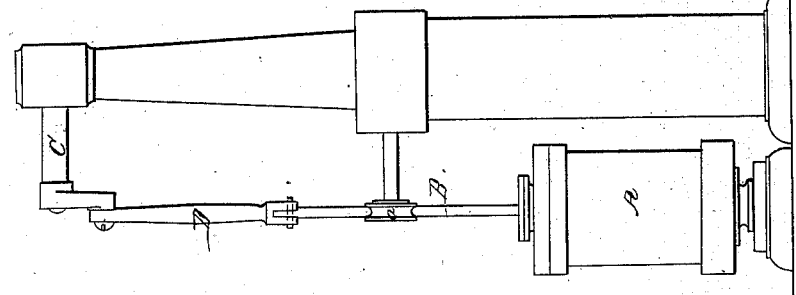
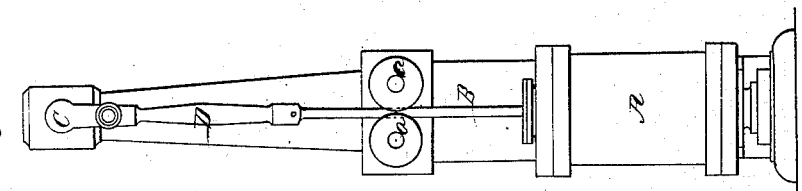
Witnesses Inventor.

UNITED STATES PATENT OFFICE.

EDWARD DUNSCOMB, OF BOSTON, MASSACHUSETTS.

IMPROVED GUIDE FOR PISTON-RODS.

Specification forming part of Letters Patent No. 47,283, dated April 18, 1865.

*To all whom it may concern:*

Be it known that I, EDWARD DUNSCOMB, of Boston, in the county of Suffolk and Commonwealth of Massachusetts, have invented a new and useful improvement, having reference to crank or eccentric motions, &c., and I do hereby declare the same to be fully described in the following specification, and represented in the accompanying drawings, of which—

Figures 1 and 2 are front views, Fig. 3 a side view, of my invention. Fig. 4 is a front view of it, connected with the air-bell of an automatic gas-machine.

In all cases where crank or eccentric motion or movement is employed, it is well known that at the point of junction between the rotary movement of the crank and the movement of the object with which it is connected there is much strain and friction. In the steam-engine, for instance, if the piston be connected to the crank by a single connecting-rod, the strain and friction come alternately upon the upper and lower surface of the piston and the interior of the cylinder. Where a piston-rod is used and connected with the crank by a second or connecting rod and slides in bearings or upon ways, the friction and strain come upon said bearings or upon the sliding ways.

My invention is intended to reduce this strain and friction by employing, instead of the ordinary bearings, a series of anti-friction rollers, or in applying the rollers to the piston cross-head and to operate in connection with the sliding ways.

In the drawings, A denotes the cylinder of a steam-engine, B the piston-rod, C the crank, D the connecting-rod, they being constructed as usual in steam-engines; *a a*, anti-friction rollers, which, as shown in the drawings, are grooved in their outer periphery and so placed as to be nearly in contact with each other, and so that the piston-rod in its vertical movements between them shall form a perfect bearing against their grooved surfaces. These anti-friction rollers may be suitably supported upon a post or frame making part of the engine or of any other machine with which they may be used.

In Fig. 4 of the drawings I have shown the air-bell F of an automatic gas-machine suspended from the crank by a rope or chain, F', which passes between the anti-friction rollers in a manner similar to that of the piston-rod before described. This arrangement of a rope or chain in place of a connecting-rod, in connection with the grooved pulleys, will be found to have a very beneficial result in the construction and operation of automatic gas-machines, as by means of the flexible properties of said rope or chain no strain or friction can come upon the sides of the air-bell in the line of revolution of the crank, as in the case of a steam-engine, before mentioned. In both cases the reduction of friction by use of pulleys is equally beneficial.

The anti-friction rollers, instead of being applied as above described, may be applied to the cross-head and to operate in connection with the ordinary ways or guides as now usually made.

It is obvious that my invention is capable of very extensive application, and I confine it not to the precise places or details as above described; but

I claim as my invention

In a crank, eccentric, or any equivalent motion or movement, the employment and application of anti-friction rollers, substantially as hereinbefore described.

EDWARD DUNSCOMB.

Witnesses:
   I. J. CUTTER,
   S. M. P. STONE.